United States Patent
Bowser

(10) Patent No.: US 6,719,824 B1
(45) Date of Patent: Apr. 13, 2004

(54) CYCLIC MEMBRANE SEPARATION PROCESS

(75) Inventor: John Bowser, Newark, DE (US)

(73) Assignee: CMS Technology Holdings, Inc., Wilmington, DE (US)

( * ) Notice: Subject to any disclaimer, the term of this patent is extended or adjusted under 35 U.S.C. 154(b) by 53 days.

(21) Appl. No.: 10/350,867

(22) Filed: Jan. 24, 2003

(51) Int. Cl.$^7$ .............................................. B01D 53/22
(52) U.S. Cl. ..................... 95/50; 95/47; 95/54; 96/4; 96/14
(58) Field of Search ........................ 95/8, 12, 19, 45, 95/47, 50, 54; 96/4, 8, 10, 13, 14

(56) References Cited

U.S. PATENT DOCUMENTS

| | | | |
|---|---|---|---|
| 3,339,341 A | | 9/1967 | Maxwell et al. |
| 3,455,817 A | * | 7/1969 | Modell ..................... 210/640 |
| 4,553,983 A | | 11/1985 | Baker ........................... 55/16 |
| 4,687,578 A | * | 8/1987 | Stookey ................. 210/321.87 |
| 4,994,094 A | | 2/1991 | Behling et al. ............... 55/16 |
| 5,051,114 A | * | 9/1991 | Nemser et al. ............... 95/47 |
| 5,084,073 A | * | 1/1992 | Prasad ........................... 95/52 |
| 5,205,842 A | * | 4/1993 | Prasad ........................... 95/47 |
| 5,205,843 A | | 4/1993 | Kaschemekat et al. ......... 55/16 |
| 5,281,255 A | * | 1/1994 | Toy et al. ....................... 95/50 |
| 5,383,956 A | * | 1/1995 | Prasad et al. ................... 95/45 |
| 5,464,466 A | | 11/1995 | Nanaji et al. .................. 95/45 |
| 5,537,911 A | | 7/1996 | Ohlrogge et al. .............. 95/22 |
| 5,571,310 A | | 11/1996 | Nanaji .............................. 96/4 |
| 5,611,841 A | * | 3/1997 | Baker et al. ................... 95/50 |
| 5,626,649 A | | 5/1997 | Nanaji .......................... 95/12 |
| 5,676,736 A | * | 10/1997 | Crozel ........................... 95/45 |
| 5,755,854 A | * | 5/1998 | Nanaji .......................... 95/11 |
| 5,843,209 A | * | 12/1998 | Ray et al. ...................... 95/52 |
| 5,985,002 A | | 11/1999 | Grantham ...................... 95/47 |
| 6,059,856 A | | 5/2000 | Ohlrogge et al. ................ 95/1 |
| 6,174,351 B1 | * | 1/2001 | McDowell et al. .............. 96/4 |
| 6,221,131 B1 | * | 4/2001 | Behling et al. ................ 95/50 |
| 6,293,996 B1 | | 9/2001 | Grantham et al. ............. 95/47 |
| 6,361,583 B1 | | 3/2002 | Pinnau et al. .................. 95/45 |
| 6,478,852 B1 | * | 11/2002 | Callaghan et al. ............. 95/54 |
| 2002/0062733 A1 | * | 5/2002 | Grantham et al. ............. 95/19 |

FOREIGN PATENT DOCUMENTS

EP 0430331 A1 * 6/1991

OTHER PUBLICATIONS

Developing Technology for Enhanced Vapor Recovery: Part 1–Vent Processors, Koch, W.H., Technology Resources International, Inc. Feb., 2001.

* cited by examiner

Primary Examiner—Robert H. Spitzer
(74) Attorney, Agent, or Firm—Jeffrey C. Lew

(57) ABSTRACT

A cyclic process for controlling environmental emissions of volatile organic compounds (VOC) from vapor recovery in storage and dispensing operations of liquids maintains a vacuum in the storage tank ullage. In one of a two-part cyclic process ullage vapor is discharged through a vapor recovery system in which VOC are stripped from vented gas with a selectively gas permeable membrane. In the other part, the membrane is inoperative while gas pressure rises in the ullage. Ambient air is charged to the membrane separation unit during the latter part of the cycle.

25 Claims, 4 Drawing Sheets

CYCLIC MEMBRANE SEPARATION PROCESS

Support was provided under Department of Energy grant DE-FG02-00ER82976. The U.S. government has rights in the patent application.

FIELD OF THE INVENTION

This invention relates to a cyclic process using a selectively gas permeable membrane to separate a component from a gas mixture. More specifically, it relates to a membrane separation process useful for recovery of volatile organic compounds emitted from storage tanks utilizing a membrane comprising a selectively gas permeable membrane polymer. The process includes repetitively cycling between flow and non-flow of gas through the membrane.

BACKGROUND OF THE INVENTION

Liquid volatile organic compounds ("VOC") are stored and dispensed from tanks. A very common example is in the field of distribution of combustion engine fuel such as gasoline for fueling automobile and aircraft engines. The storage tanks usually have large capacities, receive bulk shipments of fuel from a supply source and dispense smaller amounts in multiple events, e.g., filling individual automobile tanks at service stations. The gas space above the liquid in the tank is sometimes called the "ullage" of the tank. Usually there is a high concentration of VOC in the ullage of fuel storage tanks.

Prior to the time that air pollution by VOC emissions became an environmental protection concern, emission controls on storage tanks were directed mainly to preventing fire and explosion hazards. Few controls were aimed at curbing fugitive emissions such as emissions of VOC incidental to dispensing fuel from bulk storage tanks and to storing the fuel in the tanks.

More recently heightened awareness has developed of the need to reduce fugitive emissions resulting from storage and dispensing of VOC. As a result vapor recovery systems for VOC with increasing degrees of sophistication have been deployed. For example, to reduce environmental emissions of VOC vapor during automotive and other types of fuel fill-ups, fuel suppliers and distributors have begun to install vapor recovery systems at fuel dispensing stations. Such systems usually have suction equipment that draws VOC vapors and air present during fuel transfer at the fuel dispensing nozzle back to the ullage of a bulk storage tank. The returning gas mixture enters the void in the tank created when the dispensed liquid leaves.

Traditionally storage tanks merely had P/V valves (Pressure-Vacuum valves) intended to maintain the tank within a range of slight positive and negative pressure, i.e., a few inches of water pressure. The returning gas mixture from dispensing operations, as well as other factors, caused pressure to build up in the ullage over time. Of course, when tank pressure exceeded the upper limit of the P/V valve, excess gas containing VOC was discharged to the environment.

Certain advanced VOC fugitive emission control systems are designed to operate with a slight negative pressure in the ullage of the bulk storage tank. That is the tank is under a vacuum relative to ambient atmosphere. Such systems offer the advantage that any leaks that occur will cause outside air to flow into the vapor recovery systems, rather than allow vapor to escape to the atmosphere. In addition to the gas buildup mentioned earlier, air in-leakage contributes to pressure increase in the tank. The liquid fuel evaporates into the incoming fresh air and the mass of the vaporized fuel plus the mass of air within the fixed ullage volume increases the pressure. Negative pressure thus can only be maintained if gas is exhausted to the environment from time to time. However, it is necessary to strip all or a portion of the VOC from the exhausted gas. Otherwise, the VOC in the discharged gas defeats the purpose of the pollution control system.

Various techniques have been proposed to remove VOC emissions from bulk storage tanks operating at subatmospheric pressure. A method gaining commercial acceptance uses a selectively gas permeable membrane to separate the VOC component from the benign air component of the ullage mixture. The non-VOC component, composed primarily of nitrogen and oxygen, is preferentially permeable through the membrane and is emitted to atmosphere substantially free of the VOC component. VOC is less permeable, largely does not pass through the membrane and is returned to the storage tank.

The membrane separation vapor recovery system is contemplated to operate cyclically and emit to atmosphere discontinuously. Emissions occur only when the tank pressure exceeds a pre-selected high pressure limit. At other times, flow through the membrane is stopped. For example, tank pressure descends below the high pressure limit as a consequence of discharging primarily non-VOC component gas to the ambient atmosphere. At a preselected low pressure limit, discharge stops. At these times, the vapor is stagnant in the separation membrane module and in the gas transfer lines immediately upstream and downstream of the module.

Although the separation membrane selectively permeates oxygen and nitrogen, it does not absolutely reject VOC compounds. Consequently, the gas that permeates the membrane and is vented to the environment includes some VOC vapor, albeit less than that which would vent had the membrane not been utilized. It has been discovered that a very high concentration pulse of VOC vapor emits from the membrane module at the start of a venting cycle, i.e., directly after rising tank pressure initiates flow through the membrane and venting commences at the end of a stagnant period. After a while, the concentration of VOC in the permeate/exhaust gas decreases to a steady state value in the expected manner. A significant quantity of VOC vapor is released to the atmosphere by the time the gas venting portion of the cycle stops. As a result, the time-averaged quantity of VOC compounds discharged to the air is still unacceptably high.

It is desirable to reduce overall emissions of VOC compounds below that which results from conventional separation membrane-based, fuel tank vapor recovery systems.

SUMMARY OF THE INVENTION

Accordingly, the present invention now provides a cyclic gas separation process for separating more preferentially permeable gas components from less preferentially permeable gas components of a feed gas mixture of such components, the process comprising the steps of (a) providing a membrane module having a selectively gas permeable membrane for the more preferentially permeable gas components and the less preferentially permeable gas components, (b) simultaneously (i) feeding the feed gas mixture to the module to contact the feed gas mixture with a first side of the membrane, (ii) discharging from the module in fluid communication with a second side of the membrane a permeate gas mixture enriched in the more preferentially permeable gas components, and (iii) withdrawing from the module in fluid communication with the first side of the membrane a retentate gas mixture enriched in the less preferentially permeable gas components, (c) stopping the feeding of the gas feed mixture to the first side and stopping the discharging of the permeate gas mixture, (d) charging a diluent gas to the module, (e) ceasing the charging of diluent gas to the module, and (f) repeating steps (b)–(e).

There is also provided a process for reducing atmospheric emissions of volatile organic compound vapor from ullage gas of a liquid volatile organic compound storage tank, the process comprising (a) providing a vapor recovery system comprising (i) a membrane module comprising a two-sided gas permeable membrane comprising a polymer having a glass transition temperature and a selectivity for permeation of air relative to permeation of volatile organic compounds, and (ii) an exhaust pump having an intake and a discharge to ambient atmosphere, in which one side of the membrane defines a feed-retentate chamber on a first side of the membrane in fluid communication with the ullage gas and the second side of the membrane defines a permeate chamber in fluid communication with the intake of the exhaust pump, (b) for a first length of time simultaneously and continuously (i) conveying the ullage gas into the feed-retentate chamber of the module so as to contact the first side of the membrane with the ullage gas, (ii) separating the ullage gas to form a low organic content gas depleted in volatile organic compounds relative to the ullage gas and a high organic content gas enriched in volatile organic compounds relative to the ullage gas, (iii) exhausting the low organic content gas from the module to ambient atmosphere, and (iv) returning the high organic content gas from the module into the ullage gas in the storage tank, (c) for a second length of time, stopping the conveying of the ullage gas, the separating of the ullage gas, the exhausting of the low organic content gas and the returning of the high organic content gas, (d) during step (c) charging air to the vapor recovery system in a quantity effective to remove volatile organic compounds from the membrane module, and (e) repeating steps (b)–(d).

This invention also provides an improved vapor recovery system for controlling emissions of vapor from a storage tank containing volatile organic compound comprising (a) a storage tank containing an inventory of liquid of volatile organic compounds and an ullage within the tank containing a vapor of the volatile organic compounds, (b) a membrane module comprising a selectively gas permeable two sided membrane adapted to separate air from the volatile organic compounds and which membrane defines a feed-retentate chamber on the first side of the membrane and a permeate chamber on the second side of the membrane, (c) a blower adapted to move a gas mixture from the ullage into the feed-retentate chamber in contact with the membrane, (d) a return transfer line in fluid communication between the membrane module and the ullage and adapted to move a high organic content gas enriched in volatile organic compounds relative to the gas mixture back to the ullage, (e) a vent transfer line in fluid communication between the membrane module and ambient atmosphere, and (f) an exhaust pump in the vent transfer line which pump is operative to exhaust a low organic content gas depleted in volatile organic compounds relative to the gas mixture from the membrane module, wherein the improvement comprises an air charging means for intermittently introducing air into the membrane module.

The novel process and system are effective to reduce the cumulative amount per cycle of less preferentially permeable gas components in the permeate gas mixture below that which is produced when no air is charged into the membrane module.

DETAILED DESCRIPTION

Figure 1:
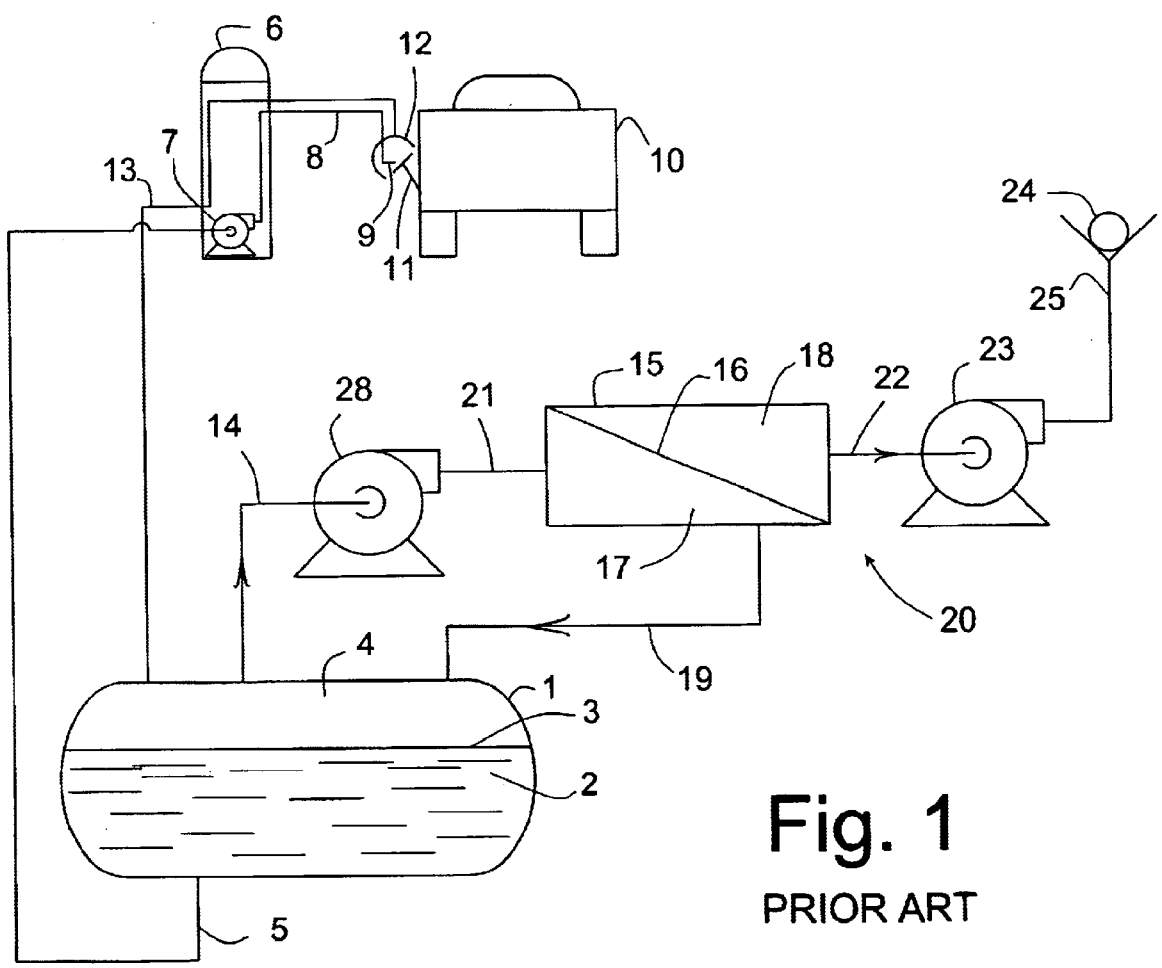
FIG. 1 is a schematic diagram of a conventional apparatus for carrying out a cyclic gas separation process.

With reference to the schematic flow diagram of FIG. 1 it is seen that a traditional liquid fuel dispensing system includes a bulk fuel storage tank 1 that contains an inventory of liquid fuel 2. The volume of the tank above the liquid level 3 is known as the ullage 4. The liquid fuel is typically a highly volatile organic compound ("VOC") and therefore, the ullage is occupied by a gas composition which is highly concentrated in VOC vapor. In a typical fuel dispensing operation adapted to refuel automobile tanks with gasoline, the liquid gasoline is withdrawn from the storage tank via a transfer line 5 that leads to a pumping station 6. The gasoline is dispensed by fuel dispensing pump 7 via a hose 8 through nozzle 9 into the filler tube 11 and mobile tank in automobile 10.

Modern conventional fuel dispensing systems also typically include a vapor capturing apparatus 12. Typically, the vapor capturing apparatus is a part of the fuel filling nozzle. The capturing apparatus 12 is designed to draw into vapor transfer line 13 fugitive VOC vapor emitted as the fuel pours into the filler tube. This vapor is generated by a small amount of the volatile liquid fuel vaporizing while going into the tank and by VOC vapor in the automobile tank that is displaced by the incoming liquid fuel. The capturing apparatus may also draw in some air that leaks through gaps in the seal between the capturing apparatus and the filler tube.

Preferably the ullage of the bulk storage tank and the vapor transfer line 13 are maintained at subatmospheric pressure so that any leaks draw vapor into the tank. This prevents pollution of the environment that might occur by VOC vapor leaking out if the pressure was positive relative to atmospheric pressure. Some dispensing system designs utilize a vacuum pump in vapor transfer line 13 (not shown). This supplements the vacuum driving force provided by the low pressure at the storage tank to capture fugitive emissions at the nozzle. Many independently operating dispensing stations can be connected to the bulk storage tank although only one is illustrated. In installations with multiple storage tanks, a common vapor transfer line is often used.

The bulk storage tank is equipped with a vapor recovery system 20 which includes, among others, elements 28, 15, 23, 24 and connecting transfer lines. Recovery system 20 functions in large part to generate the subatmospheric pressure within the ullage 4. Gas in the ullage is drawn out by gas conveying device 28 and is blown through membrane module 15. Then the gas is exhausted to atmosphere through vent line 25. A second gas conveying device 23 additionally helps remove the vented gas.

Operation of the vapor recovery system 20 takes place in repetitive cycles that each have two sequential segments. Customarily, the system operation cycles between segments as needed to maintain pressure in the ullage at a vacuum between a lower vacuum limit and an upper vacuum limit. As fuel is dispensed at station 6 vapor continues to feed into the ullage 4 through line 13 and pressure in the ullage can increase or decrease depending on the volume ratios of fuel dispensed to the gas returned to the ullage, but it usually increases. Inward leakage will cause the pressure inside the tank to rise gradually. Pressure in the storage tank can also increase as a consequence of refilling of the tank itself, temperature changes, or evaporation of the liquid over time. Upon the pressure elevating to the upper vacuum limit, the first segment begins and the gas conveying devices 28 and 23 start running. As this first segment of operation proceeds, gas is expelled from the vent by continued operation of the gas conveying devices and pressure in the tank drops. When pressure drops below the lower pressure limit, the second segment starts and gas conveying devices shut down. This causes movement of the gases through the vapor recovery system 20 to cease. Pressure buildup then resumes and the cycle repeats.

In further detail, the vapor recovery system includes a vapor take off line 14 that leads into a membrane module 15 which contains a selectively gas permeable separation membrane 16. The membrane divides the interior of the module into a feed-retentate chamber 17 and a permeate chamber 18 which are each in contact with opposite sides of the membrane. The membrane material has the ability to pass certain components of the gas mixture taken from the ullage and to reject other components. Typically, oxygen, nitrogen and other minor concentration, low molecular weight gaseous components present in air, e.g., argon, ozone, carbon dioxide and the like, permeate through the membrane. VOC vapor molecules permeate very slowly compared to the other permeating components. Consequently, the feed-retentate chamber becomes enriched with VOC which are returned to the bulk storage tank 1 through return line 19. An air conveying device 28, such as a vacuum pump, blower, fan or similar mechanism forces the VOC-enriched gas through the return line 19.

As a result of selective permeation, gas in the permeate chamber 18 has a lower concentration of VOC than the gas in the ullage of the tank. However, it may, and usually does, contain some small amount of VOC. Ordinarily, the cleaned air with reduced VOC contamination is drawn from the permeate chamber through line 22 utilizing air conveying device 23. This air can then be discharged to atmosphere. A check valve 24 or similar conventional flow control device can be employed to prevent ambient air from flowing backward through the vapor recovery system into the storage tank and raising the pressure in the tank. The main objective of the vapor recovery system is to discharge to the environment as little VOC as practicable.

The process and apparatus of this invention differ from conventional technology for vapor recovery of VOC primarily in that for at least a portion of the second segment of the cyclic process a quantity of diluent gas is charged into the membrane module 15. While the diluent enters, the valves in the vapor recovery system are adjusted to direct the flowing diluent in a manner that will be explained more thoroughly below. The diluent gas can be any gaseous composition that is free of the components rejected by the membrane, i.e., VOC. The diluent gas also should not be reactive with VOC at conditions existing in the vapor recovery system. Examples of suitable diluent gas compositions include air, carbon dioxide, hydrogen, helium, nitrogen and mixtures thereof Preferably, the diluent gas is air.

As a beneficial consequence of introducing diluent gas into the membrane module during the second segment of each cycle the amount of VOC emitted per cycle from the vapor recovery system to the environment is reduced. The precise reason for the reduction of VOC emissions discovered to occur when air is deliberately charged to the module during the second segment of each cycle is not presently understood. Without wishing to be bound by a particular theory, it is thought that the reduction is based on two phenomena. Firstly, during operation of a conventional vapor recovery system as depicted in FIG. 1, VOC are present in the module at the end of each first segment. The gas concentration in the feed chamber is the same as in the ullage of the storage tank. The second segment of each cycle typically lasts about 30 and is much longer than the first segment. During this period the concentration of VOC on the two sides of the membrane equilibrates. Thus a comparatively large quantity of VOC migrates into the permeate chamber. At beginning of the first segment of the next cycle the quantity of VOC residing in the permeate chamber flows forward to the vent transfer line and ultimately to the ambient environment. In accord with the novel process, however, a significant portion of the VOC present in the module at the end of the first segment is displaced to the storage tank by diluent gas before the next cycle first segment starts. Therefore less VOC is available to surge through the module and to exhaust through the vent line at each first segment start-up.

Secondly, the diluent gas tends to purge the free volume of the selectively gas permeable membrane. By comparison, in the conventional process exposure of the membrane to high concentration of VOC during the second segment causes VOC present in the module to occupy to a high degree the free volume of the membrane composition. The term "plasticizing" (of the membrane) is used to refer to this condition. The plasticized membrane is not in optimum condition to selectively permeate the non-VOC components during the first segment of each cycle. More specifically, a membrane plasticized with VOC would be expected to permeate a higher amount of VOC than one which is not plasticized. Under the novel process, the diluent gas sweeps past or through the membrane. This draws at least some VOC out of the free volume and thereby places the membrane in better condition to selectively permeate the gas mixture components during the first segment portion of the next cycle.

The novel process and system are thus adapted to remove preferably at least about 5% of the VOC that would otherwise be present at first segment start-up. More preferably the amount removed is at least about 10%, and most preferably at least about 25%. The VOC emissions will be less than would occur had the diluent gas not been added to the module during the second segment. Preferably, the VOC emissions will be reduced by more than 10%.

The effectiveness of the novel vapor recovery system can be explained with reference to FIG. 2. Curve A represents typical performance expected during one cycle for a bulk fuel storage tank using a conventional vapor recovery system such as that shown in FIG. 1. It is a plot of the concentration in vent line 25 of VOC content as volume percent of the gas emitting from a hypothetical system. The accumulation of gas returning to the storage tank 1 from fuel dispensing operations and inward leakage increase the pressure within the storage tank to a pressure above the high vacuum limit. This triggers activation of the vapor recovery system. First segment operation begins with gas conveying devices 28 and 23 starting up (point A1). Detection of an increase in VOC concentration by a sensor in the vent line 25 occurs a short time, usually about several seconds later (point A2). As first segment operation of the recovery system continues ullage gas selectively permeates the membrane and displaces the initially high VOC concentration gas in the permeate chamber to the vent. This lowers the pressure in the storage tank and also causes the VOC concentration in the vent line to climb steeply (point A3). The membrane operates to reject VOC, and consequently, the concentration of VOC in the emitted gas peaks and begins to drop (point A4). Thereafter, the VOC concentration reduces gradually (point A5) and begins to approach a steady state value. The elapsed time between points A1 and A6 is relatively brief, and usually extends from about 30 seconds to about 3 minutes. When a sufficient quantity of gas has been vented from the system to reduce the pressure in the storage tank below the lower vacuum limit, (point A6) an automatic control system causes the gas conveying devices 28 and 23 to stop operating as the second segment begins. The second segment usually lasts for a long time as compared to the first segment. Not uncommonly, the duration is at least about 15 minutes and can be in the range of about 30 minutes to about 1–3 hours or still longer, depending upon the sizes of the storage tank and the ullage gas volume and the rate of in-leakage. Breaks in the abscissa and curves in FIG. 2 indicate the extended passage of time. Because the sensor in the vent line 25 is normally distant from the module and because flow is stopped during the second segment, the concentration of VOC remains at a value $VOC_0$. This value is well above zero because some VOC do permeate the membrane during the first segment and are present in the vented gas. The first segment of the next cycle begins at point A1'.

Figure 2:
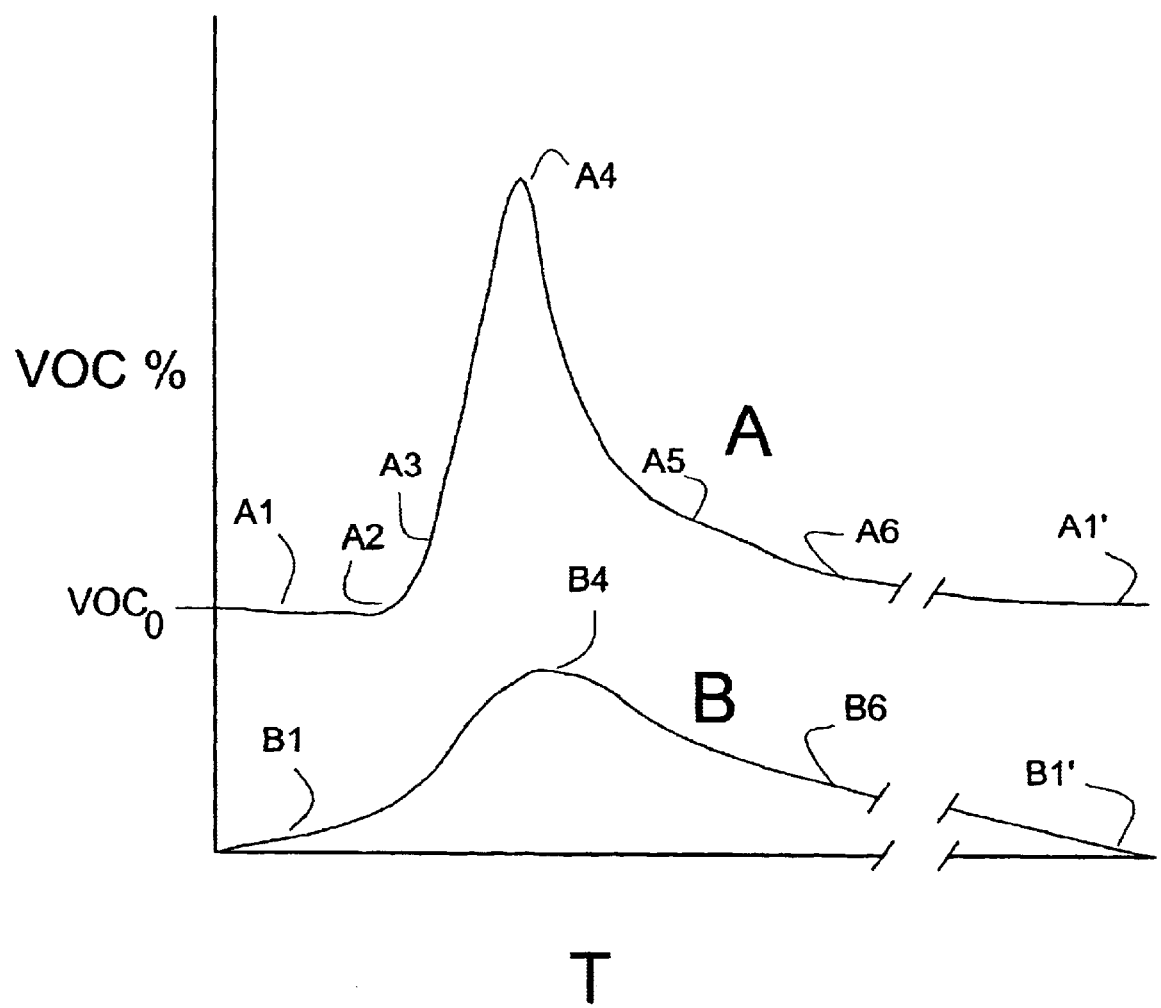
FIG. 2 is a typical plot of VOC concentration in gas emitted vs. time for single cycles of operation of a conventional vapor recovery system as shown in FIG. 1 and of a vapor recovery system according to an embodiment of the novel process.

FIG. 2 also shows curve B for the VOC concentration vs. time performance of a similarly VOC fuel dispensing unit in which the vapor recovery system is operated according to this invention. The events in the cycle occur at the same times as just described. That is, first segment occurs in the period between points B1 and B6. The second segment period is from point B6 to point B1'. However, some ambient air is charged into the membrane module during the second segment of operation. Due to the charging of air the peak concentration (point B4) is lower than the peak concentration of the conventional process. Also, because the module is purged with diluent gas that is free of VOC, the VOC concentration of gas in the vent line ultimately reduces to near zero at commencement of the next first segment (point B1'). The rate of reduction of VOC concentration in the second segment (i.e., between points B6 and B1') depends upon the geometry of any particular system and the location of the sensor relative to the position where the diluent gas is introduced. In sum, the cumulative area under curve B during first segment (i.e., between points B1 and B6) representing the total amount of VOC discharged to the environment per cycle, is less than occurs conventionally.

Various embodiments of the novel process and system will now be described with reference to FIG. 3. Like parts in different drawing figures have common reference numbers.

In an aspect of the invention, the diluent gas is charged to the membrane module at a position in fluid communication with the permeate chamber of the module. Hence in one embodiment of the present invention the vapor recovery system is modified to incorporate automatic block valve 36 in diluent gas feed line 35. In operation, valve 36 is opened for a period of time during the second segment of the cycle. This allows a supply of diluent gas, preferably ambient air, to enter the permeate chamber. Under the driving force of pressure due to the vacuum condition then existing in ullage 4, the air permeates backward through the membrane and into the feed-retentate chamber. The fresh air thus dilutes the VOC in the permeate chamber and is thought to purge the plasticizing VOC from the free volume of the membrane material. At a time defined by a preset time span, a sensed VOC concentration in the system or a pressure in the system, backward flow into the ullage is stopped. This prevents further rise of the pressure in the storage tank. Stopping backward flow can be accomplished by closing valves 32 and 33, or alternatively closing valve 36. Before the first segment of the next vapor recovery cycle starts, valves 32, 33, and 36 are reset respectively to open, open, and closed conditions.

The position of valve 32 is not critical. It can be placed anywhere in feed gas transfer line 14, 21 between ullage 4 and the feed-retentate chamber. Valve placement proximate to the entrance of the feed-retentate chamber is preferred because this reduces the volume of dead space which the dilution gas encounters as it travels toward the ullage. Likewise, valve 33 may be placed anywhere in the retentate line between the storage tank and membrane module, but it is preferred to be proximate to the feed-retentate chamber. Similarly, diluent air feed line 35 can be placed downstream of gas conveying device 23. Naturally, this presumes that gas conveying device 23 and all other intervening equipment in the permeate discharge line from the air introduction point to the permeate chamber of the module do not significantly impede the backward flow of gas. It is recalled that the diluent air is charged during the second segment of vapor recovery operation during which gas conveying devices 28 and 23 are shut down.

Other variations of the above mentioned embodiment are also contemplated. For example, line 35 can feed directly into the permeate chamber. Alternatively, if air can pass backwards through conveying device 23 when the device is stopped, the function of valve 36 can be replaced by valve 37 or a bidirectional valve replacing check valve 24. For example, check valve 24 may be replaced by a pressure-vacuum ("P/V") valve, which, during the second segment, will admit diluent air into the permeate chamber until the pressure gradient across the P/V valve drops below a preselected minimum value.

In another aspect, the diluent gas is charged to the membrane module at a position in fluid communication with the feed-retentate chamber of the module. For example, diluent air would be charged through line 35a, and controlled by valve 36a. In operation, at appropriate time, block valve 32 is closed while air flows in through valve 36a. Because the ullage is at negative pressure relative to the incoming diluent gas, the gas will travel through the feed-retentate chamber and return to the ullage via line 19.

For better results, i.e., lower VOC emissions, the diluent gas should sweep across the feed-retentate surface of the membrane 16. Care should be exercised to configure the position of the incoming diluent gas line 35a to assure that a significant portion of the gas does not bypass contact with the membrane surface. This often can be accomplished by placing the feed line 35a and return line 19 at opposite ends of the feed-retentate chamber.

Other contemplated variations are those in which the diluent gas feed line is placed at a different position in the module feed line. For example, line 35a can be positioned in transfer line 14 upstream of gas conveying device 28. With line 35a in this position, valve 38 should be closed during the second segment and gas conveying device 28 can optionally be used to push air through the feed-retentate chamber. Unless check valve 24 is functional to prevent the escape of possible outflow, it is recommended to include an optional block valve 37 in the permeate discharge line for this purpose.

In another possible variation, line 35a can be positioned in line 19 between valve 33 and the feed/retentate chamber.

As mentioned, a major objective of the novel vapor recovery system is to enable reduced environmental emissions of VOC vapor while operating the vapor system in fluid communication with the ullage of the storage tank at a pressure below ambient atmospheric pressure. Lower emissions occur if a diluent gas is added to the membrane module during at least a portion of the second segment of each vapor recovery operation cycle. Certain control protocols are contemplated to achieve this.

According to one such protocol the diluent gas is charged to the module during times that the pressure at a preselected position in the system is within a predetermined pressure range. Again, it is recognized that the start of the second segment of the vapor recovery cycle is characterized by a low pressure in the vapor handling system. Charging diluent gas to the module will cause the system pressure to increase. This control protocol provides that the diluent gas flows into the module until the system pressure rises to a predetermined upper pressure limit. This protocol can be implemented in various ways. For example, an electronic pressure sensor can be used to trigger control of admission of diluent gas. In another representative example, control can be effected mechanically, for instance by using a P/V valve at position 24, (FIG. 4) as mentioned previously.

A different operating protocol calls for charging diluent gas for a duration effective to obtain a specified concentration at a position in the module or connected piping. That is, a sensor for a VOC concentration analyzer can be placed in fluid communication with the feed-retentate chamber or the permeate chamber. The analyzer should be capable of providing real-time analyses of VOC concentration and generating a signal for input to an automatic control system. The control system is adapted to manipulate valve 36 or 36a in response to the input signal. Such analyzers and control systems are well known in the art. An example of such a control system is the C-series of programmable logic controllers (PLC's) available from Omron Electronics LLC, One East Commerce Drive, Schaumburg, Ill., 60173. An example of an appropriate analyzer is the model 317WP nondispersive infrared hydrocarbon sensor manufactured by Nova Analytical Systems, LTD., 270 Sherman Ave. N., Hamilton, ON, Calif., L8L 6N5. The vapor in the module or piping at commencement of the second segment will have an initial, relatively high, concentration of VOC. Upon introduction of the diluent gas, the VOC concentration will reduce. This protocol provides that the diluent gas flows into the module until the VOC concentration at the sensor position descends below a predetermined lower concentration limit.

In another operating protocol the charging of diluent gas occurs for a duration of predetermined length of time. That is, at some time after start of the second segment, the gas dilution feed valve is opened to allow diluent gas to enter the module. The valve remains open only for a length of time selected in advance. At expiration of the time limit, the diluent gas feed valve is closed. Preferably, the diluent gas feed period begins simultaneously with commencement of the second segment. Flow rate of diluent gas is another parameter that can be adjusted to optimize the reduction of VOC emissions. For example, during the predetermined duration for gas charging, the flow rate can be maintained at a fixed value. Emission results can be observed for one or more successive cycles. Either the diluent gas flow rate, the diluent gas feed duration or a combination of rate and duration can be changed for different cycles to determine which settings provide optimum emission performance. In another contemplated embodiment, the flow rate of diluent gas can be throttled according to a predetermined program. That is, while the diluent gas valve is open the flow rate can be increased, decreased or otherwise adjusted for best results.

It should be understood that any combination of more than one of the above mentioned control protocols can also be implemented. One of ordinary skill in the art given the teaching of this disclosure will be able to manipulate the control variables to achieve lowest VOC emissions without undue experimentation.

The novel process and system incorporates a module that comprises a selectively gas permeable membrane. Any membrane composition that has good selectivity for components of air relative to VOC can be used. Usually the membrane is a polymer composition. VOC are known to be solvents for many polymers. Thus the membrane composition should be inert to VOC.

Preferably the membrane should include a thin layer of selectively permeable, high free volume, non-porous polymer. The non-porous layer can be supported on a porous substrate, such as a microporous hollow fiber. Representative polymers include polytrimethylsilylpropyne, polyperfluoro(allyl vinyl ether), copolymers of 2,2,4-trifluoro-5-trifluoromethoxy-1,3-dioxole and tetrafluoroethylene (TFE), and certain amorphous copolymers of perfluoro-2,2-dimethyl-1,3-dioxole ("PDD"). Copolymers of PDD are particularly preferred in that they have a unique combination of superior permeability and selectivity for a variety of gas mixtures. Especially preferred are copolymers of PDD with fluoromonomers such as TFE, vinylidene fluoride, perfluoromethyl vinyl ether, hexafluoropropylene, chlorotrifluoroethylene and mixtures thereof. Gas separation membranes comprising PDD are disclosed in U.S. Pat. No. 5,051,114 (Nemser et al.) the entire disclosure of which is hereby incorporated by reference herein.

The structure of the membrane module is not critical. Flat, pleated, spiral wound, ribbon tube and hollow fiber membranes can be used. Hollow fiber membranes are preferred. Hollow fiber membranes can be assembled in large numbers within a so-called hollow fiber membrane module. The structure and method of hollow fiber membrane modules is well known in the art. For example, see U.S. Pat. No. 3,339,341 (Maxwell et al.) and U.S. Pat. No. 5,985,002 (Grantham) the entire disclosures of which are hereby incorporated by reference herein.

The disclosure above is directed largely to embodiments of this invention in which the polymer component of the selectively gas permeable membrane is utilized in a so-called glassy polymeric state. It is well understood in the field of polymer physical chemistry that amorphous polymers and amorphous regions of crystalline polymers undergo second order phase transitions defined by a glass transition temperature ("Tg"). At temperatures well below Tg these polymers are hard, stiff and glassy although not necessarily brittle. In a temperature zone near Tg the polymers are leathery and at temperatures well above Tg they are rubbery.

The performance of selectively gas permeable polymer membranes is affected by whether the polymer is glassy or rubbery. For example, the selectivity between the atmospheric gas species that are usually present in ambient air, i.e., oxygen, nitrogen, argon, carbon dioxide and the like, and vapor species of VOC is such that glassy selective polymers preferentially permeate atmospheric gas species relative to the VOC species. Conversely, rubbery selective polymers are preferentially permeable to VOC and less preferentially permeable to the atmospheric gases. The vapor recovery systems shown in FIGS. 1 and 3 are designed to emit to atmosphere the permeate compositions. Therefore these systems utilize glassy polymer membranes which separate ullage gas into a permeate enriched in air and depleted of VOC vapor. The VOC vapor enriched retentate is returned to the storage tank.

It is contemplated that the novel process for reducing emissions of VOC can be applied to a vapor recovery system that utilizes a rubbery polymer. Very basically stated, such a system differs from a glassy polymer membrane system in that the retentate gas composition of the former is emitted to atmosphere and the permeate gas composition is returned to the ullage of the storage tank. A gas recovery system of this type is disclosed in U.S. Pat. No. 5,571,310 of Nanaji, the entire disclosure of which is hereby incorporated by reference herein.

Figure 4:
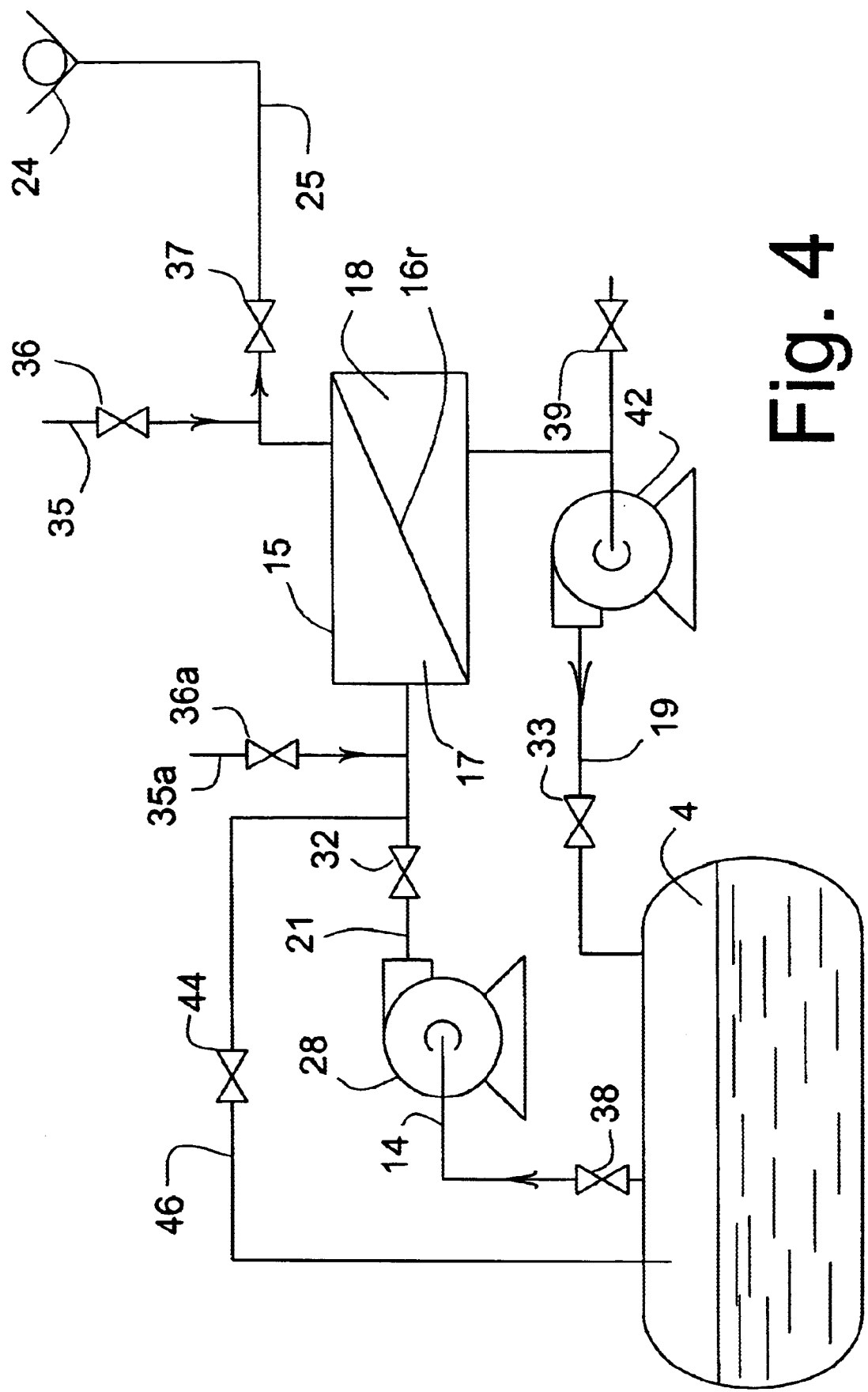
FIG. 4 is a schematic diagram showing another embodiment of the vapor recovery system according to the present invention.

FIG. 4 illustrates a schematic flow diagram for the novel vapor recovery system of this invention that utilizes a rubbery polymer gas selective membrane 16r. During the first segment of cyclic operation, ullage gas flows from ullage 4 through transfer lines 14 and 21 into the feed-retentate chamber 17 of module 15. Feed gas conveying device 28 pressurizes the feed to facilitate separation by membrane 16r and to force the benign retentate through the exhaust transfer line to vent valve 24. VOC components preferentially transfer through the membrane into permeate chamber 18 and this VOC enriched composition is returned to the ullage via transfer line 19. A vacuum pump 42 assists in drawing the permeate through the membrane.

At a suitable time as described above, the second segment of operation begins. Vacuum pump 42 and gas conveying device 28 are stopped and valve 33 is closed. Within the second segment of operation, valve 36 is opened to admit a diluent gas, preferably air, from line 35 into the feed-retentate chamber 17. Line 35 can be configured to introduce the diluent gas directly into chamber 17 or indirectly via transfer line 25 as shown. Valves 32 and 38 and other system elements in lines 14 and 21 are adapted to allow flow of purged gas from the feed-retentate chamber backward into the ullage 4. Alternatively, an optional bypass return line 46 is provided. Thus when any system elements such as device 28 prevent backflow, valve 44 can be opened and purged gas from feed-retentate chamber 17 can flow into ullage 4 through bypass return 46.

The diluent gas should be introduced to the feed-retentate chamber such that the chamber 17 is adequately purged of VOC species prior to starting the first segment of the next cycle. Preferably the diluent gas should flow through the chamber to maximize the purging effect. Therefore, introduction of diluent gas via line 35a upstream of the module, e.g., into transfer line 21 is less preferred.

The feed-retentate chamber 17 should not be purged by introducing the diluent gas into the permeate chamber 18 of the module. While not wishing to be bound by a particular theory, it is believed that VOC species preferentially migrate through the rubbery polymer selective membrane by passing through a polymer in which VOC are highly absorbed. Should diluent gas flow backward from the permeate chamber, through the rubbery polymer membrane so as to purge the feed-retentate chamber it is expected that the membrane polymer would also be purged of VOC. This would render the membrane less effective to permeate VOC immediately upon starting the next cycle first segment.

Theoretically, one might select a membrane of a particular amorphous polymer and choose to operate at temperatures above Tg where the polymer is rubbery or below the Tg where the polymer is glassy. Then the appropriate configuration, i e., either that of FIG. 3 or FIG. 4, would be selected for the vapor recovery system. In practice, however, one is expected to choose a polymer which has an optimum combination of performance, mechanical and physical property characteristics. That is, the selectivity and permeance respecting the substances being separated as well as the ability to fabricate the polymer into a durable membrane in desired form and to operate the membrane at a temperature compatible with the vapor recovery process should all be considered. The totality of these factors will determine whether the polymer is glassy or rubbery at separation conditions and which flow configuration should be used.

EXAMPLES

This invention is now illustrated by examples of certain representative embodiments thereof, wherein all parts, proportions and percentages are by volume unless otherwise indicated. All units of weight and measure not originally obtained in SI units have been converted to SI units.

Examples 1–5 and Comparative Examples 1–5

Fixed Duration Protocol Vapor Recovery System Operation

Figure 3:
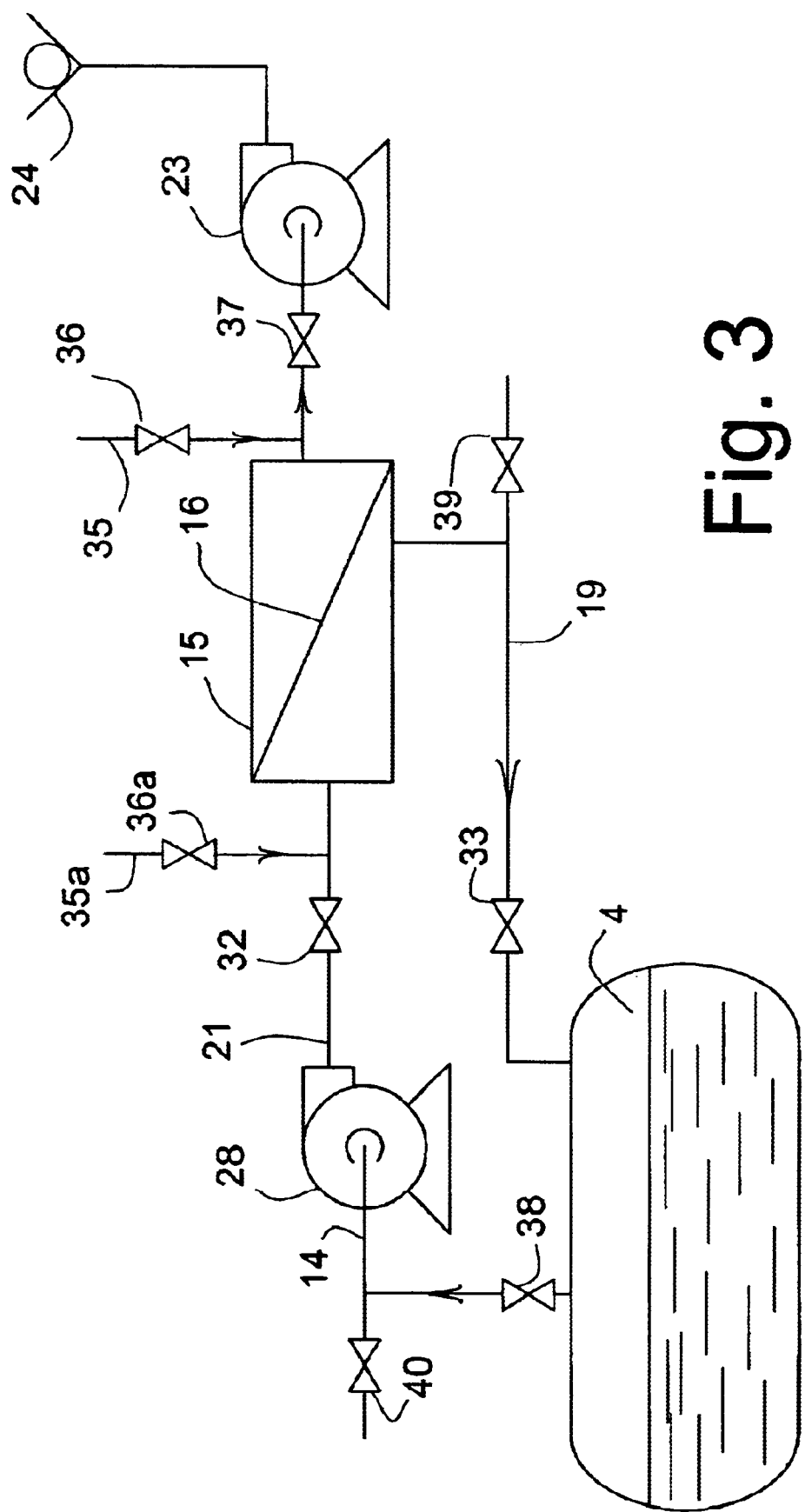
FIG. 3 is a schematic diagram showing an embodiment of the vapor recovery system according to the present invention.

Experiments were performed at the site of an operating retail gasoline service station using a vapor processor system with the configuration illustrated in FIG. 3. The service station had three underground gasoline storage tanks with ullage spaces in fluid communication. Together, they held 50327 liters of liquid gasoline at a temperature of 15 C, and a total of 58901 liters of ullage volume. VOC levels were measured in the vent stream with a Nova Analytical Systems Model 7204FS hydrocarbon analyzer modified to operate on the NDIR (nondispersive infrared) principal.

A series of vapor recovery cycles was operated in the apparatus described above. During the second segment portion of the test cycles ambient air feed was either not admitted to the membrane module, admitted to the module on the permeate chamber side of the membrane, or admitted to the module on the feed retentate chamber side of the module. As applicable, the air was admitted at beginning of the second segment. Settings of the valves in the system during the second segment were as illustrated in Table I below:

TABLE I

| Valve # | No Air Admission | Feed Air Admission | Permeate Air Admission |
| --- | --- | --- | --- |
| 32 | Open | Open | Open |
| 33 | Open | Closed | Open |
| 36 | Closed | Closed | Open |
| 36a | Closed | Closed | Closed |
| 37 | Open | Open | Open |
| 38 | Open | Closed | Open |
| 39 | Closed | Open | Closed |
| 40 | Closed | Open | Closed |

During Feed Air Admission, Gas Conveying Device 28, which was a blower, was activated so as to move air through the feed retentate chamber at a rate of 820 liters per minute.

VOC concentration (VOC %) of the gas leaving the vent stack was measured during the immediately subsequent first segment portion. Three concentration values were determined for each cycle. These were (i) the initial VOC concentration at start of first segment, i.e., (point A2, FIG. 2) when membrane separation started, (ii) peak VOC concentration, i.e., (point A4, FIG. 2) the maximum vented concentration, and (iii) final VOC concentration (point A6, FIG. 2) when membrane separation stopped. From these determinations, the difference between the peak height and the value at the end of the cycle (P-E) was calculated. Air admission conditions and analytical results are presented in Table II.

TABLE II

| Sample | | Second Segment Air Feed | | A2 Initial | A4 Peak | A6 End | A4-A6 P-E |
|---|---|---|---|---|---|---|---|
| | No. | Place | Duration | VOC % | VOC % | VOC % | VOC % |
| Comp.Ex.1 | 0939 | — | None | 1.9 | 9.3 | 4.9 | 4.4 |
| Comp.Ex.2 | 0959 | — | None | 1.4 | 9.1 | 5.1 | 4.0 |
| Comp.Ex.3 | 1025 | — | None | 1.7 | 9.1 | 5.0 | 4.1 |
| Ex. 1 | 1040 | Permeate | 10 min. | 2.9 | 4.9 | 3.8 | 1.1 |
| Ex. 2 | 1051 | Permeate | ca. 1 sec. | 2.4 | 7.3 | 4.5 | 2.8 |
| Comp.Ex.4 | 1105 | — | None | 2.0 | 9.2 | 5.3 | 3.9 |
| Ex.3 | 1117 | Feed | 10 sec. | 3.4 | 4.7 | 4.1 | 0.6 |
| Ex.4 | 1125 | Feed | 3 sec. | 2.8 | 5.7 | 4.4 | 1.3 |
| Ex.5 | 1135 | Permeate | 5 min. | 3.3 | 5.0 | 4.2 | 0.8 |
| Comp.Ex.5 | 1146 | — | None | 1.7 | 9.5 | 5.4 | 4.1 |

The data reveals that when air was added to the module, peak concentrations were substantially lower according to the novel process (4.7–7.3% vs. 9.1–9.5%). End VOC values (representing the steady state running condition) for the invention were also lower than the controls (3.8–4.5% vs. 4.9–5.4%). P-E values for the conventional process were consistently about 4 percentage units while the operative examples did not exceed 2.8 percentage units. Generally, longer admission times for the air produced lower overall VOC concentrations of air emitted during the cycle. Although Ex. 2 demonstrated the effectiveness of the invention, the amount of VOC emission reduction was intermediate because of the mere momentary duration of the air feeding. When Ex. 2 results are excluded, the operative examples dramatically point to the fact that both the peak and steady state VOC emissions are much improved by practice of this invention.

Although specific forms of the invention have been selected for illustration in the drawings and the preceding description is drawn in specific terms for the purpose of describing these forms of the invention fully and amply for one of average skill in the pertinent art, it should be understood that various substitutions and modifications which bring about substantially equivalent or superior results and/or performance are deemed to be within the scope and spirit of the following claims.

What is claimed is:

1. A cyclic gas separation process for separating more preferentially permeable gas components from less preferentially permeable gas components of a feed gas mixture of such components, the process comprising the steps of
   (a) providing a membrane module having a selectively gas permeable membrane for the more preferentially permeable gas components and the less preferentially permeable gas components,
   (b) simultaneously (i) feeding the feed gas mixture to the module to contact the feed gas mixture with a first side of the membrane, (ii) discharging from the module in fluid communication with a second side of the membrane a permeate gas mixture enriched in the more preferentially permeable gas components, and (iii) withdrawing from the module in fluid communication with the first side of the membrane a retentate gas mixture enriched in the less preferentially permeable gas components,
   (c) stopping the feeding of the gas feed mixture to the first side and stopping the discharging of the permeate gas mixture,
   (d) charging a diluent gas to the module,
   (e) ceasing the charging of diluent gas to the module, and
   (f) repeating steps (b)–(e).

2. The process of claim 1 in which the diluent gas is charged to the module in fluid communication with the first side of the membrane.

3. The process of claim 2 in which the membrane comprises a polymer having a glass transition temperature, the diluent gas is free of the more preferentially permeable gas components and in which the process comprises feeding the feed gas mixture to the module at a temperature above the glass transition temperature.

4. The process of claim 3 in which the more preferentially permeable gas components are volatile organic compounds.

5. The process of claim 1 in which the membrane comprises a polymer having a glass transition temperature, the diluent gas is free of the less preferentially permeable gas components and in which the process comprises feeding the feed gas mixture to the module at a temperature below the glass transition temperature.

6. The process of claim 5 in which the diluent gas is charged to the module in fluid communication with the second side of the membrane.

7. The process of claim 5 in which the diluent gas is charged in a quantity effective to reduce the cumulative amount per cycle of less preferentially permeable gas components in the permeate gas mixture below that which is produced when steps (d) and (e) are not performed.

8. The process of claim 5 in which the quantity of diluent gas is effective to reduce the cumulative amount per cycle of less preferentially permeable gas components in the permeate gas mixture by at least 10% of that which is produced when steps (d) and (e) are not performed.

9. The process of claim 1 in which the feed gas mixture comprises volatile organic compounds and the diluent gas comprises air.

10. A process for reducing atmospheric emissions of volatile organic compound vapor from ullage gas of a liquid volatile organic compound storage tank, the process comprising
   (a) providing a vapor recovery system comprising (i) a membrane module comprising a two-sided gas permeable membrane comprising a polymer having a glass transition temperature and a selectivity for permeation of air relative to permeation of volatile organic compounds, and (ii) an exhaust pump having an intake and a discharge to ambient atmosphere, in which one side of the membrane defines a feed-retentate chamber on a first side of the membrane in fluid communication with the ullage gas and the second side of the membrane defines a permeate chamber in fluid communication with the intake of the exhaust pump,
   (b) for a first length of time simultaneously and continuously (i) conveying the ullage gas into the feed-retentate chamber of the module so as to contact the first side of the membrane with the ullage gas, (ii) separating the ullage gas to form a low organic content gas depleted in volatile organic compounds relative to the ullage gas and a high organic content gas enriched in volatile organic compounds relative to the ullage gas, (iii) exhausting the low organic content gas from the module to ambient atmosphere, and (iv) returning the high organic content gas from the module into the ullage gas in the storage tank, (c) for a second length of time, stopping the conveying of the ullage gas, the separating of the ullage gas, the exhausting of the low organic content gas and the returning of the high organic content gas, (d) during step (c) charging air to the vapor recovery system in a quantity effective to remove volatile organic compounds from the membrane module, and (e) repeating steps (b)–(d).

11. The process of claim 10 in which the charging step (d) commences when the stopping step (c) begins.

12. The process of claim 10 in which air is charged in a quantity effective to reduce the cumulative amount per cycle of the volatile organic compounds in the low organic content gas by at least 10% of that which is produced when steps (c) and (d) are not performed.

13. The process of claim 10 in which the first length of time commences when pressure in the storage tank exceeds a preselected subatmospheric upper pressure limit and lasts until the pressure declines below a preselected subatmospheric lower pressure limit and in which the second length of time commences immediately after the first length of time expires.

14. The process of claim 10 which comprises continuing the second length of time until the occurrence of any one of (a) a preselected duration expires, (b) pressure at a predetermined location in the vapor recovery system exceeds a subatmospheric upper pressure limit, and (c) concentration of the volatile organic compounds at a predetermined location in fluid communication with the membrane module reduces below a predetermined lower concentration limit.

15. The process of claim 10 which comprises charging the air to a location in the vapor recovery system in fluid communication with the first side of the membrane.

16. The process of claim 15 which comprises separating the ullage gas at a temperature above the glass transition temperature such that the volatile organic compounds more preferentially permeate the membrane relative to air, exhausting the low organic content gas from the feed-retentate chamber of the module and returning the high organic content gas from the permeate chamber of the module.

17. The process of claim 10 which comprises separating the ullage gas at a temperature below the glass transition temperature such that the volatile organic compounds less preferentially permeate the membrane relative to air, exhausting the low organic content gas from the permeate chamber of the module and returning the high organic content gas from the feed-retentate chamber of the module.

18. The process of claim 17 which comprises charging the air to a location in the vapor recovery system in fluid communication with the second side of the membrane.

19. The process of claim 18 in which the charging step further comprises causing the air to permeate through the membrane from the second side to the first side, to pass into the feed-retentate chamber and to enter into the ullage gas of the storage tank, thereby removing volatile organic compounds from the module.

20. In a vapor recovery system for controlling emissions of vapor from a storage tank containing volatile organic compound comprising (a) a storage tank containing an inventory of liquid of volatile organic compounds and an ullage within the tank containing a vapor of the volatile organic compounds, (b) a membrane module comprising a selectively gas permeable two sided membrane adapted to separate air from the volatile organic compounds and which membrane defines a feed-retentate chamber on the first side of the membrane and a permeate chamber on the second side of the membrane, (c) a blower adapted to move a gas mixture from the ullage into the feed-retentate chamber in contact with the membrane, (d) a return transfer line in fluid communication between the membrane module and the ullage and adapted to move a high organic content gas enriched in volatile organic compounds relative to the gas mixture back to the ullage, (e) a vent transfer line in fluid communication between the membrane module and ambient atmosphere, and (f) an exhaust pump in the vent transfer line which pump is operative to exhaust a low organic content gas depleted in volatile organic compounds relative to the gas mixture from the membrane module, wherein the improvement comprises an air charging means for intermittently introducing air into the membrane module.

21. The vapor recovery system of claim 20 in which the improvement further comprises a flow control means for temporarily stopping flow of the gas mixture between the storage tank and the membrane module.

22. The vapor recovery system of claim 21 in which the improvement further comprises an exhaust block valve in the vent transfer line which is operative to stop flow of the low organic content gas from the membrane module to the ambient atmosphere while the air charging means is introducing air into the membrane module.

23. The vapor recovery system of claim 20 in which the air charging means comprises an air inlet valve in fluid communication with the feed-retentate chamber, the air inlet valve adapted to control flow of air from a source of air to the membrane module.

24. The vapor recovery system of claim 20 in which the membrane comprises a rubbery polymer having a glass transition temperature and which polymer is adapted to separate the gas mixture at a temperature above the glass transition temperature.

25. The vapor recovery system of claim 24 in which the air charging means comprises an air inlet valve in fluid communication with the permeate chamber the air inlet valve adapted to control flow of air from a source of air to the membrane module.

* * * * *